July 25, 1972   R. R. FINKBINER   3,679,490
ADJUSTABLE DEPTH IMMERSION TEMPERATURE SENSING DEVICE
Filed July 10, 1970
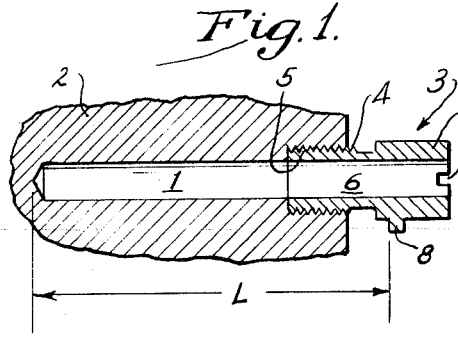
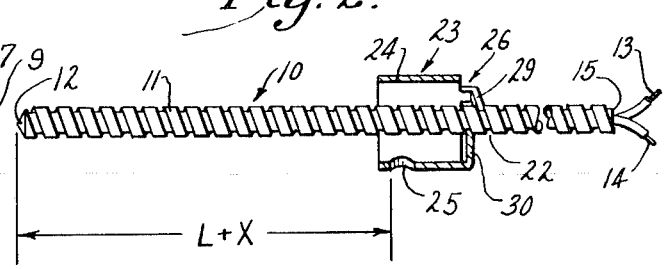
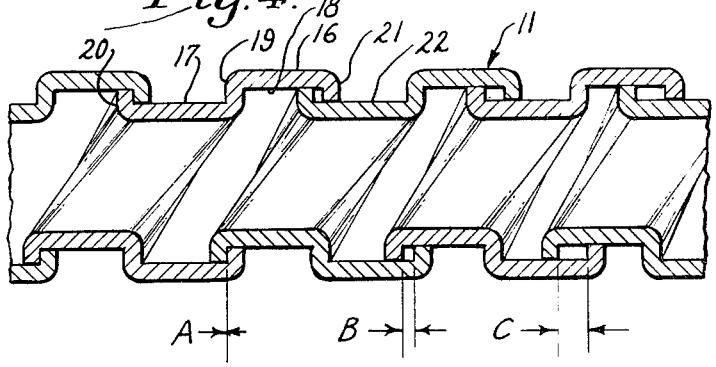
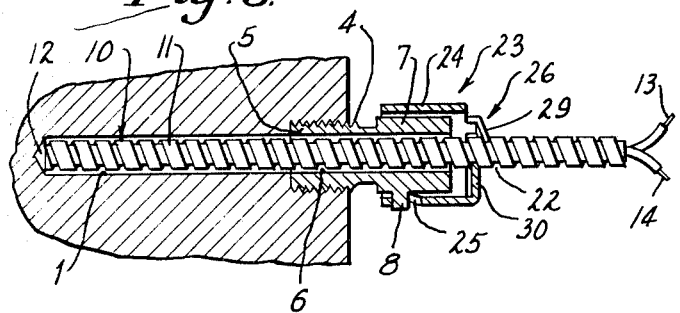
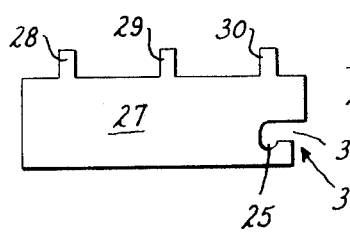
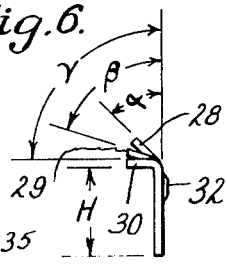
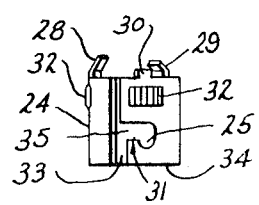
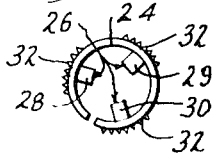
INVENTOR.
Roy R. Finkbiner
BY
AGENT United States Patent Office 3,679,490
Patented July 25, 1972

3,679,490
ADJUSTABLE DEPTH IMMERSION TEMPERATURE
SENSING DEVICE
Roy R. Finkbiner, Indianapolis, Ind., assignor to Barber-Colman Company, Rockford, Ill.
Filed July 10, 1970, Ser. No. 53,853
Int. Cl. H01v 1/02
U.S. Cl. 136—221                    12 Claims

ABSTRACT OF THE DISCLOSURE

A thermocouple enclosed in a protective flexible spiral overlap cable is adjustable as to depth of immersion in a well by means of a bayonet cap threaded on the cable and engageable with a coupling pin in fixed relation to the well to releasably retain the thermocouple pressed against the closed end of the well.

BACKGROUND OF THE INVENTION

This invention is concerned with measurement of temperature within a body as distinguished from surface temperature. To obtain accurate measurements of temperature at an internal location it is necessary to position a temperature sensor in, or at least closely adjacent to, that location. A well, drilled or otherwise formed, and leading from the surface to the desired internal point is used to permit access in solid materials. For fluid or plastic materials a closed end tube forming a well leads from the outside of the enclosure for the material to the desired internal point, the tube being attached to the enclosure in a manner to prevent leakage of the material. It is essential that the sensing element be in intimate contact with the well, so it is customary to spring press the sensor against the bottom or closed end of the well. Since thermocouples, thermistors, other sensing devices and their leads are rather fragile, it is customary to provide mechanical protection, usually in the form of a rigid cylindrical tube. Lambert Pat. No. 3,468,723, issued Sept. 23, 1969 discloses a device representative of the prior art.

SUMMARY OF THE INVENTION

This invention provides mechanical protection for a thermal sensing device and its lead. It provides a sensing device quickly and easily insertable into and removable from a well. It provides means for releasably retaining a sensor in a well. It further provides a temperature sensor that may be spring pressed against the bottom of a well of any depth. It requires fewer parts to provide the same functions obtained by the prior art. It requires fewer assembly operations than prior art devices having comparable features. It is less expensive to produce than prior devices of this type.

BRIEF DESCRIPTION OF THE DRAWINGS

FIG. 2 is an elevation partially in section of an ex-
FIG. 1 is a sectional view through a well in a block of solid material and a bayonet type adapter aligned with the well.
FIG. 2 is an elevation partally in section of an exemplary, preferred embodiment of an adjustable immersion type thermocouple and bayonet cap according to the teachings of this invention.
FIG. 3 is a sectional view of the thermocouple of FIG. 2 installed in a well as in FIG. 1.
FIG. 4 is a sectional view of the cable used in FIG. 2.
FIG. 5 is a plan view of a blank from which the cap may be formed.
FIG. 6 is an end view of the blank partially formed.
FIG. 7 is an elevation of the finished cap.
FIG. 8 is a bottom view of the finished cap.

DESCRIPTION OF THE PREFERRED EMBODIMENT

In FIG. 1 is shown a typical well 1 formed as by drilling a blind hole into a block 2 of solid material. A coupling device shown as a bayonet type adapter 3 has a threaded portion 4 screwed into a mating threaded portion 5 in the block 2 at the outer end of well 1, a bore 6 aligned with the well, a head 7 remote from the threaded portion 4, a pin 8 extending radially from the head 7, and a cross-slot 9 in the end of the head to assist in the threading of the adapter 3 into the block 2. All that is shown in FIG. 1 is commonly used and well-known to those skilled in the art, as shown by Lambert. The depth of well 1 may be any desired amount and its diameter is chosen to freely accept a thermocouple.

The immersion temperature sensitive assembly 10 shown in FIG. 2 comprises a longitudinally resilient conduit 11, closed at one thermally sensitive end 12 as by silver solder in which a thermocouple junction (not shown) is embedded, and a pair of leads 13 and 14 which may be the thermocouple wires themselves or extensions thereof leading from the junction through the conduit 11 and extending beyond the open end 15 thereof for carrying a signal from said sensor to an external measuring or control circuit (not shown). The resilient conduit is preferably also flexible and made of one or more interlocked and spirally wound strips of metal providing a well defined thread.

An acceptable type of conduit is shown in FIG. 4, employing a single metallic strip 16 formed with oppositely facing channels 17 and 18 having a common flange 19 and respective outer flanges 20 and 21. The formed strip 16 is helically wound so that the outer flanges 20 and 21 are interlocked to form a flexible conduit 11. The width of the channels 17 and 18 is greater than the thickness of outer flanges 20 and 21, leaving a well defined helical thread or groove 22 on the outside of the conduit 11 and with the outside of channel 18 forming a threaded outer surface on the conduit. It may again be pointed out that only a single formed strip 16 makes up the conduit 11, the difference in shading being employed only to distinguish adjacent portions from each other. The metal used for the strip 16 is inherently resilient so that the interlocked flanges 20 and 21 not only permit relative movement of the adjacent portions to provide flexibility, but permit the conduit 11 to exhibit the properties of a helical spring. When tension is applied to a portion of the conduit, the flanges 20 and 21 may be moved into engagement as shown by the zero dimension A. When the tension is released, the resilience of the strip 16 will cause the flanges to separate to their normal position which is shown as dimension B. If the conduit 11 is compressed, the flanges will be separated further as shown by dimension C, from which it will return to dimension B when the compressive force is removed. The conduit shown in FIG. 4 and described above is well suited for this use, but other longitudinally resilient conduit types may also be employed.

A member engageable with the conduit thread and here shown as a bayonet cap 23 is threaded on the flexible conduit 11 as shown in FIG. 2. The cap 23 comprises a tube 24 adapted to fit loosely around head 7, a lock 25 adapted to engage pin 8 and a thread 26 adapted to engage groove 22 and then rotated to move the cap 23 longitudinally along the conduit 11. The lock 25 and pin 8 constitute the complementally engaging elements of a coupling means for releasably holding the member 23 in fixed relation to the coupling device 3.

One of many possible species of caps 23 is shown in FIGS. 5 to 8. The cap is made from a sheet metal blank 27 as seen in FIG. 5 having a length approximately equal to the circumference of tube 24, a plurality of ears 28, 29 and 30 projecting upwardly, and J-shaped channel 31. The ears 28, 29 and 30 may be formed as seen in FIG. 6 to different angles $\alpha$, $\beta$, $\gamma$, respectively, at the same height H or at the same angles at different heights such that when the blank 27 is formed into tube 24 as best seen in FIG. 8, the ears will form a discontinuous internal thread 26 adapted to engage groove 22, as shown in FIG. 2. Portions of the blank 27 which will become parts of the tube 24 are coined to form an exterior knurl 32 to form a finger or wrench grip. The J-shaped channel 31 is most easily recognized in FIG. 7, showing the long side of the channel as defining a passage 33 from the lower end 34 of tube 24 for acceptance of pin 8, while the short end defines the lock 25 to engage pin 8 and the connecting portion forms a passage 35 for pin 8 between passage 33 and lock 25. The formed and coined blank 27 is rolled into the finished cap 23 as shown in FIGS. 7 and 8.

When the thermocouple assembly 10 is to be installed in a well 1, the distance L from the bottom of the well to the lower portion of pin 8 is first determined. The cap 23 is threaded onto conduit 11 and located at a distance $L+X$ from the end 12, as measured to the lower portion of lock 25, by rotating the cap 23 on the conduit 11, causing the cap to move longitudinally on the conduit due to engagement of the thread 26 with the helical groove 22. The X represents the amount of compression of conduit 11 required between end 12 and thread 26 to provide the desired load on end 12 when the thermocouple 10 is installed in well 1. The load will be proportional to the compression in accordance with Hooke's Law for springs. The end 12 is guided through bore 6 into the well 1 and the tube 24 over head 7 such that pin 8 enters passage 33. As force is applied on cap 23 to compress conduit 11, the pin 8 is moved through passage 33 to the limit of its travel, after which the cap 23 is rotated to move pin 8 through connecting passage 35 into the lock 25 where it is retained after the applied force on cap 23 is released. The conduit 11 between end 12 and thread 26 is held compressed by the distance X to apply the desired load on the end 12 against the bottom of well 1. FIG. 3 shows the thermocouple assembly 10 installed in the well 1 as related above.

Many possible modifications will be readily apparent to those skilled in the art. As examples the cap 23 could be threaded onto the head 7, a separate pin 8 could be passed through a lock hole 25 in cap 23 into a hole drilled in head 7, the head 7 and tube 24 could be transposed, the thread 26 could be separate from the tube 24 so that the tube could be rotated for coupling to the head 7 without altering the position of the cap 23 on conduit 11, and the cap 23 could be made in different ways such as drawing, extruding, cold heading, casting, turning, etc. The description only covers a preferred embodiment and is not intended to define the limits of the invention, which are presented in the claims.

I claim as my invention:

1. An adjustable depth immersion temperature sensor assembly for retention in a well equipped with a coupling device and for connection to an external circuit, said assembly comprising a longitudinally resilient conduit, an end on the conduit for insertion in said well, an external helical thread on an outer surface of the longitudinally resilient conduit, a member substantially surrounding the conduit in engagement with said thread and movable along the thread to a predetermined longitudinal position on the longitudinally resilient conduit, and means for releasably holding the member in fixed relation to said coupling device, whereby with the member in said fixed relation to the coupling device a portion of said conduit between the member and the end is longitudinally compressed within said well.

2. An assembly according to claim 1, said conduit comprising at least one helically wound interlocked strip, the thread being formed by said interlocked strip.

3. An assembly according to claim 1, said end comprising a temperature sensor.

4. An assembly according to claim 1, said end comprising a closure and a temperature sensor in heat conducting relation to said closure.

5. An assembly according to claim 4, said sensor comprising a thermocouple junction embedded in the closure.

6. An assembly according to claim 3 with means passing through the conduit for carrying a signal from said sensor.

7. An assembly according to claim 1 wherein said releasable holding means is a component of a bayonet coupling having a mating component disposed on said coupling device.

8. An assembly according to claim 1 in which said member and said coupling means are combined as a single component.

9. An assembly according to claim 1, said thread comprising a groove in the conduit.

10. An assembly according to claim 1, said member comprising a tube with a plurality of ears extending inwardly at one end to form a discontinuous internal helical thread to engage said external helical thread on the conduit.

11. In combination, a well, a coupling device affixed to said well, a longitudinally resilient conduit, a temperature sensitive end on said conduit inserted in said well, a helical thread on an outer surface of the longitudinally resilient conduit, a member substantially surrounding the conduit and movable in engagement with and along said thread to a predetermined longitudinal position on the longitudinally resilient conduit, and selectively coupled means engaged with the member and said coupling device to longitudinally compress a portion of the conduit between the bottom of said well and the member and so press said sensitive end against the bottom of said well to make a good heat conducting contact therewith.

12. A method for spring loading a temperature sensor against the bottom of a well comprising the steps of attaching the sensor at an end of a longitudinally resilient conduit having on an outer surface an external helical thread, rotating a member substantially surrounding the conduit and engaging said thread to move said member along the thread until a predetermined longitudinal position on the conduit is reached, inserting said end of the conduit in said well, moving said member to a second predetermined position with respect to said well whereby a portion of the conduit is compressed longitudinally between the bottom of said well and the member, and retaining the member in said second predetermined position to maintain said portion of the conduit in compression.

References Cited
UNITED STATES PATENTS

| | | | |
|---|---|---|---|
| 2,379,317 | 6/1945 | Picciano | 136—221 X |
| 2,493,311 | 1/1950 | Odell | 136—233 X |
| 2,779,810 | 1/1957 | Horbinski | 136—221 |
| 2,988,582 | 6/1961 | McGregor et al. | 136—221 |
| 3,477,122 | 11/1969 | Hamrick | 136—233 X |
| 3,516,872 | 6/1970 | Klassen | 136—221 |
| 3,468,723 | 9/1969 | Lambert | 136—221 |
| 3,516,873 | 6/1970 | Bonkowski et al. | 136—230 X |

CARL D. QUARFORTH, Primary Examiner

H. E. BEHREND, Assistant Examiner

U.S. Cl. X.R.

73—359; 136—201; 338—28